May 23, 1967 K. E. BUCKMAN 3,321,220
TUBE INTERCONNECTION DEVICES
Filed Nov. 3, 1964 2 Sheets-Sheet 1

Inventor
Kenneth Ernest Buckman
BY
*A. L. Snead, Jr.*
Attorney

May 23, 1967 K. E. BUCKMAN 3,321,220
TUBE INTERCONNECTION DEVICES
Filed Nov. 3, 1964 2 Sheets-Sheet 2
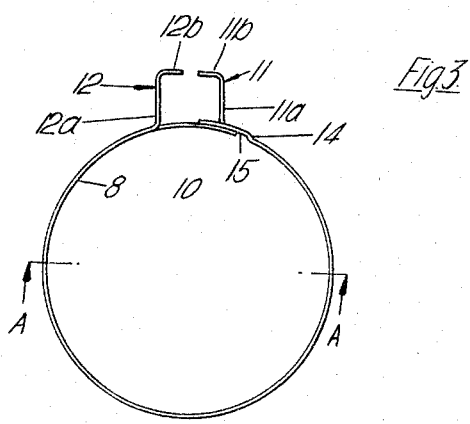
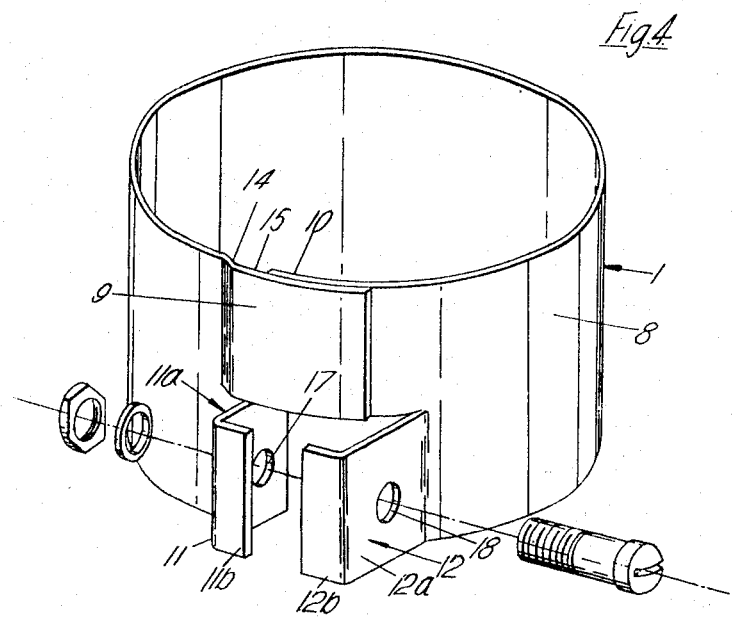
Inventor
Kenneth Ernest Buckman
BY
Attorney

United States Patent Office 3,321,220
Patented May 23, 1967

3,321,220
TUBE INTERCONNECTION DEVICES
Kenneth Ernest Buckman, Southampton, England, assignor to General Motors Corporation, Detroit, Mich., a corporation of Delaware
Filed Nov. 3, 1964, Ser. No. 408,542
Claims priority, application Great Britain, Nov. 16, 1963, 45,327/63
1 Claim. (Cl. 285—419)

This invention relates to tube interconnection devices and in particular to a combined connector and clamp device for interconnecting the outlet member of an air filter with the intake member of a carburetter.

A combined tube connector and clamp device according to the invention comprises a sheet metal strip curved to form a substantially cylindrical tube at one end of which the ends of the strip overlap each other and at the other end of which opposite ends of the strip are formed as outwardly extending arms spaced from each other and provided with a screw and nut device by which the arms can be drawn together to reduce the internal diameter of the cylindrical tube.

The overlapping end portions of the strip are arranged so that the overlap is not in alignment with the gap between the two arms; and the end of the strip which is on the outside of the overlap is preferably radially offset from the other portion of the curved strip so that the inner periphery of the tube presents a substantially uninterrupted cylindrical surface.

The arms are preferably of L-shape with the minor arms of the L extending towards each other.

The screw and nut device preferably comprises a screw which extends through openings in each arm and carries a nut which when tightened on the screw draws the arms together; alternatively one arm may be formed with a screw threaded opening in which the screw engages.

In a preferred embodiment of the invention the cylindrical tube is secured at a plurality of points at the end thereof having the overlap to an outlet neck of the air filter, the length of the cylindrical tube permitting reduction of its diameter at its opposite end upon tightening of the screw and nut connection. The inner surface of the end of the cylindrical tube carrying said arms is preferably roughened, as by knurling, to provide a better frictional contact with the end of a carburetter intake member to which it is to be secured.

The scope of the invention is defined by the appended claim; and the invention and the method by which it is to be performed are hereinafter particularly described with reference to the accompanying drawings in which:

FIGURE 3 is a plan of the device; and

FIGURE 4 is a perspective view of the device.

Figure 1:
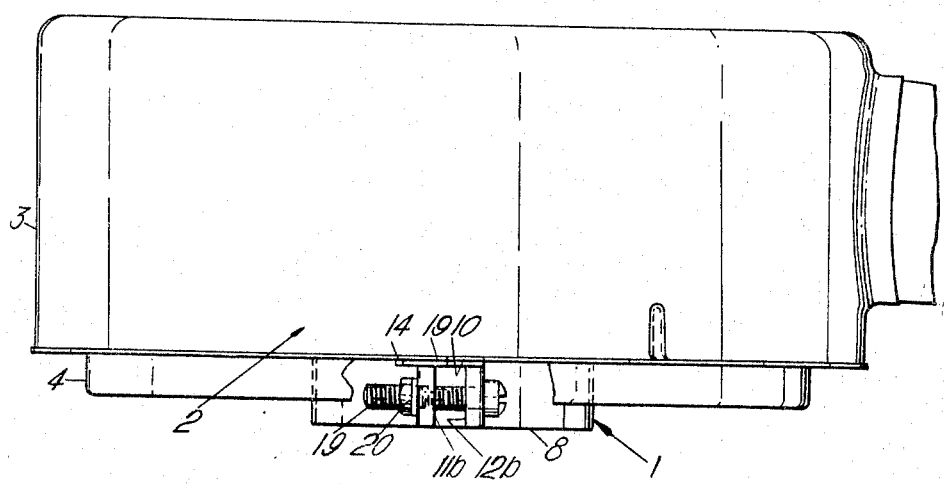
FIGURE 1 is an elevation of part of an air cleaner assembly fitted with a combined tube connector and clamp device according to the invention.
Figure 2:
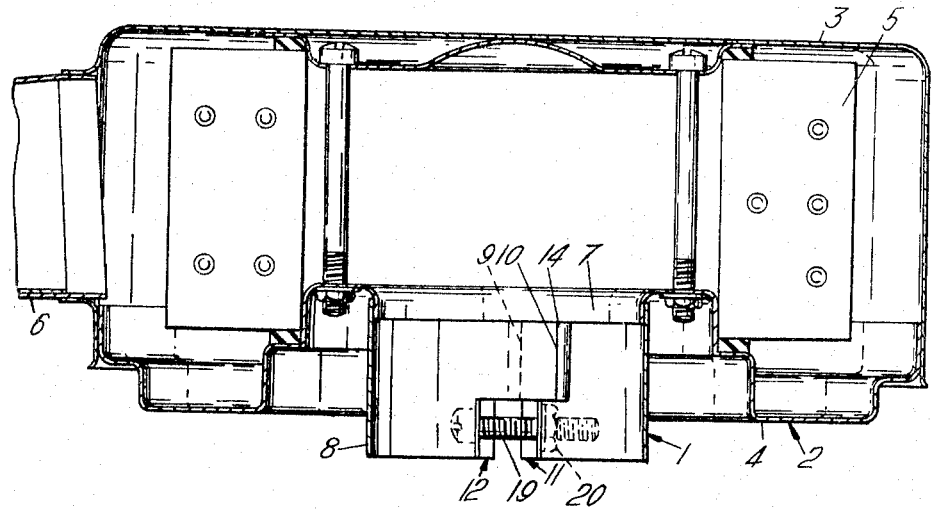
FIGURE 2 is a vertical section of the air cleaner device showing the device viewed from the inside thereof.

In the embodiment of the invention shown in the drawings the combined tube connector and clamp device 1 is provided on the lower shell of an air filter assembly 2 comprising upper and lower shells 3, 4 between which the ends of an annular air filter element 5 are clamped, the shells 3, 4 forming a chamber to which an air intake pipe 6 is connected.

Within the inner periphery of the air filter element 5 the lower shell 4 is formed with a short dependent plunging or stub tube 7 to which the connector and clamp device 1 is secured, as by welding.

The device 1 is made from a strip of sheet metal which is curved lengthwise to form a substantially cylindrical tube 8 the length of which is approximately half its diameter. At one end of the tube 8 the ends 9, 10 of the strip overlap each other, this end of the tube 8 being secured, as by welding to the stub tube 7 on the air filter shell 4. At its opposite end tube 8 has two radially outwardly extending arms 11, 12 formed from parts of the ends of the strip adjacent the end portions 9, 10, these portions being bent into L-shape, the major arms 11a, 12a of each L-shaped arm 11, 12 extending radially outwards and the minor arms 11b, 12b, thereof extending towards each other (FIGURE 3). The arms 11, 12 are formed by means of a single slit made at each of the ends of the strip parallel to and spaced from one longitudinal edge thereof.

The overlapping end portions 9, 10 of the strip subtend an angle of approximately 25° at the centre of the tube 8, and the outer end 9 of the overlapped end portions of the strip is radially offset at its junction 14 with the body of the strip so that the overlapping portions 9, 10 lie on the paths of concentric circles of slightly different radius. The free end of the inner end portion 10 of the overlapping portions is normally slightly circumferentially spaced from said offset junction 14, as shown at 15.

The relative positions of the arms 11, 12 and the overlapped portions 9, 10 of the strip are such that the centre line between the arms 11, 12 is angularly spaced by about 25° from the centre line of the overlapping portions 9, 10 thereby ensuring that the slight gap 15 at the inner periphery of the cylindrical tube between the extremity of the inner end portion 9 and the offset junction 14 of the other portion with the body of the strip is not longitudinally aligned, and therefore not in direct communication with, said gap.

The arms 11, 12 are formed with aligned holes 17, 18 and a screw 19 extends through the holes 17, 18, the screw head abutting the outer surface of one arm and a nut 20 on the screw abutting the outer surface of the other arm. The normal internal diameter of the cylindrical tube 8 is such that it is a close fit on the outer periphery of the intake tube (not shown) of a carburetter to which the air filter is to be connected, and in order to secure the air filter fast on the carburetter the inner diameter of the cylindrical tube 8 is reduced slightly by tightening the nut and bolt 19, 20 on the arms 11, 12 so as to clamp the cylindrical tube 8 rightly on to the carburetter intake tube. The frictional engagement between the cylindrical tube 8 and the carburetter intake tube may be increased by knurling the portion of the cylindrical tube which is to engage the carburetter intake tube.

It is to be understood that the invention is not limited in its appliaction as a connector device between a carburetter intake tube and an air filter but may be employed with other forms of apparatus in which two tubular parts are to be interconnected.

I claim:

A combined connector and clamp device for interconnecting an outlet tube member on an air cleaner and an inlet tube member on a carburetter to which the air cleaner is to be connected, in which said outlet tube member comprises a sheet metal strip which has a longitudinal slit in each end thereof and is curved to form a substantially cylindrical tube at one end of which two of the slit end portions of the strip overlap each other and at the other end of which the other two of the slit end portions of the strip are formed as outwardly extending arms spaced from each other, the over-all longitudinal length of said outlet tube member being less than the diameter thereof, the outer of the overlapped end portions of the strip being radially offset at its junction with the strip so that the inner periphery of the tube presents a cylindrical surface interrupted only at said junction, each arm having an opening therein and a screw extending through the openings in said arms and carrying a nut which when tightened on the screw draws said arms together to reduce the internal diameter of said tube, and said junction being out of alignment, longitudinally of the tube, with the space between said arms.

References Cited by the Examiner

UNITED STATES PATENTS

| | | | |
|---|---|---|---|
| 514,857 | 2/1894 | Laube | 285—419 X |
| 722,029 | 3/1903 | Mann | 285—322 |
| 813,674 | 2/1906 | Skirrow | 285—419 X |
| 1,255,417 | 2/1918 | Hedges | 285—419 |
| 2,080,988 | 5/1937 | Schulz | 24—279 |
| 2,543,766 | 3/1951 | Davis | 285—322 |
| 2,690,193 | 9/1954 | Smith | 285—373 X |

CARL W. TOMLIN, *Primary Examiner.*

D. W. AROLA, *Assistant Examiner.*